Sept. 28, 1954  T. R. BILL  2,690,269
CABLE REEL HANDLING AND TRANSPORTING MEANS
Filed Jan. 14, 1952  2 Sheets-Sheet 1
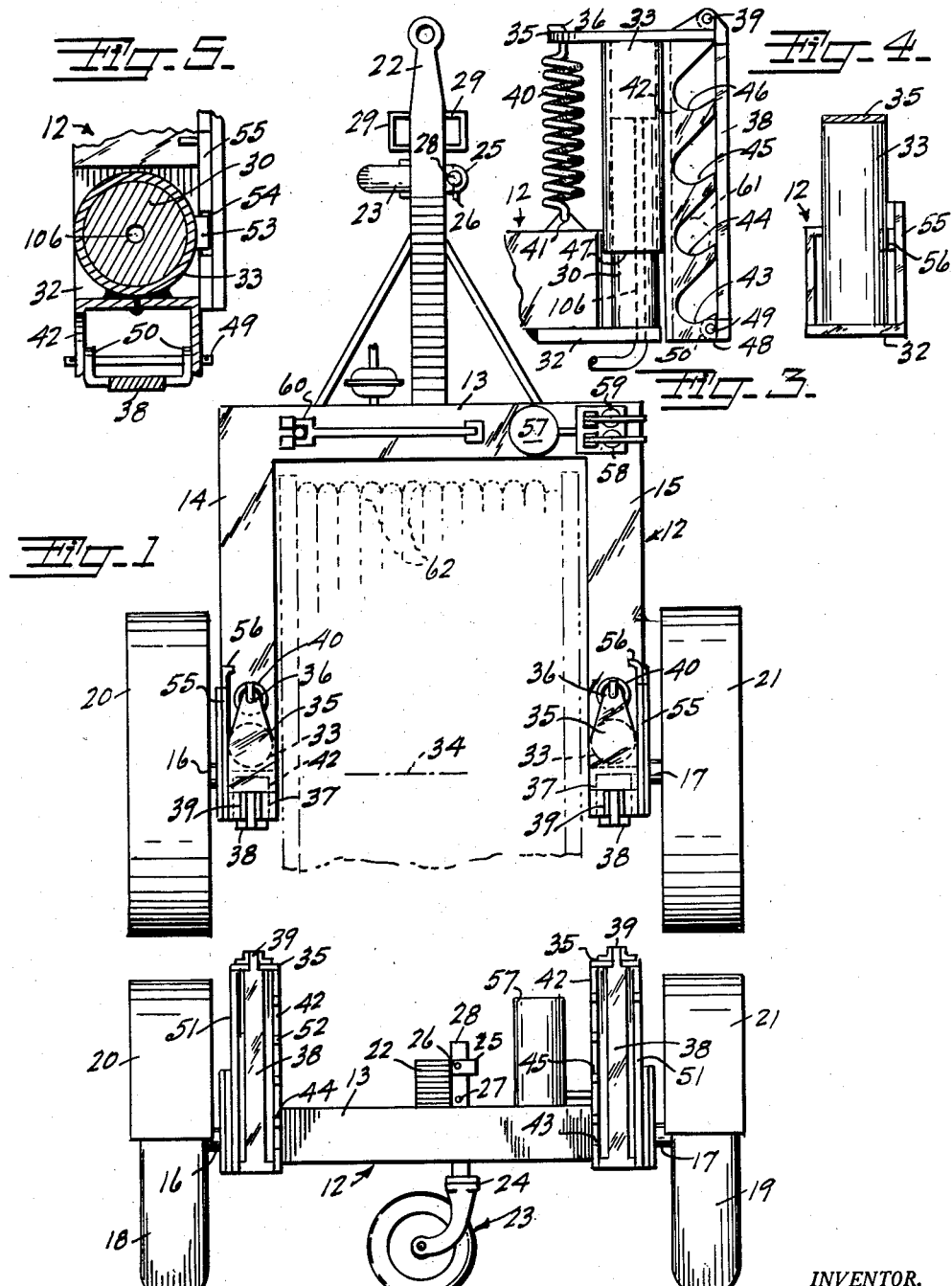
INVENTOR.
Theodore R. Bill
BY Philip R. Friedell
Attorney Sept. 28, 1954 T. R. BILL 2,690,269
CABLE REEL HANDLING AND TRANSPORTING MEANS
Filed Jan. 14, 1952 2 Sheets-Sheet 2
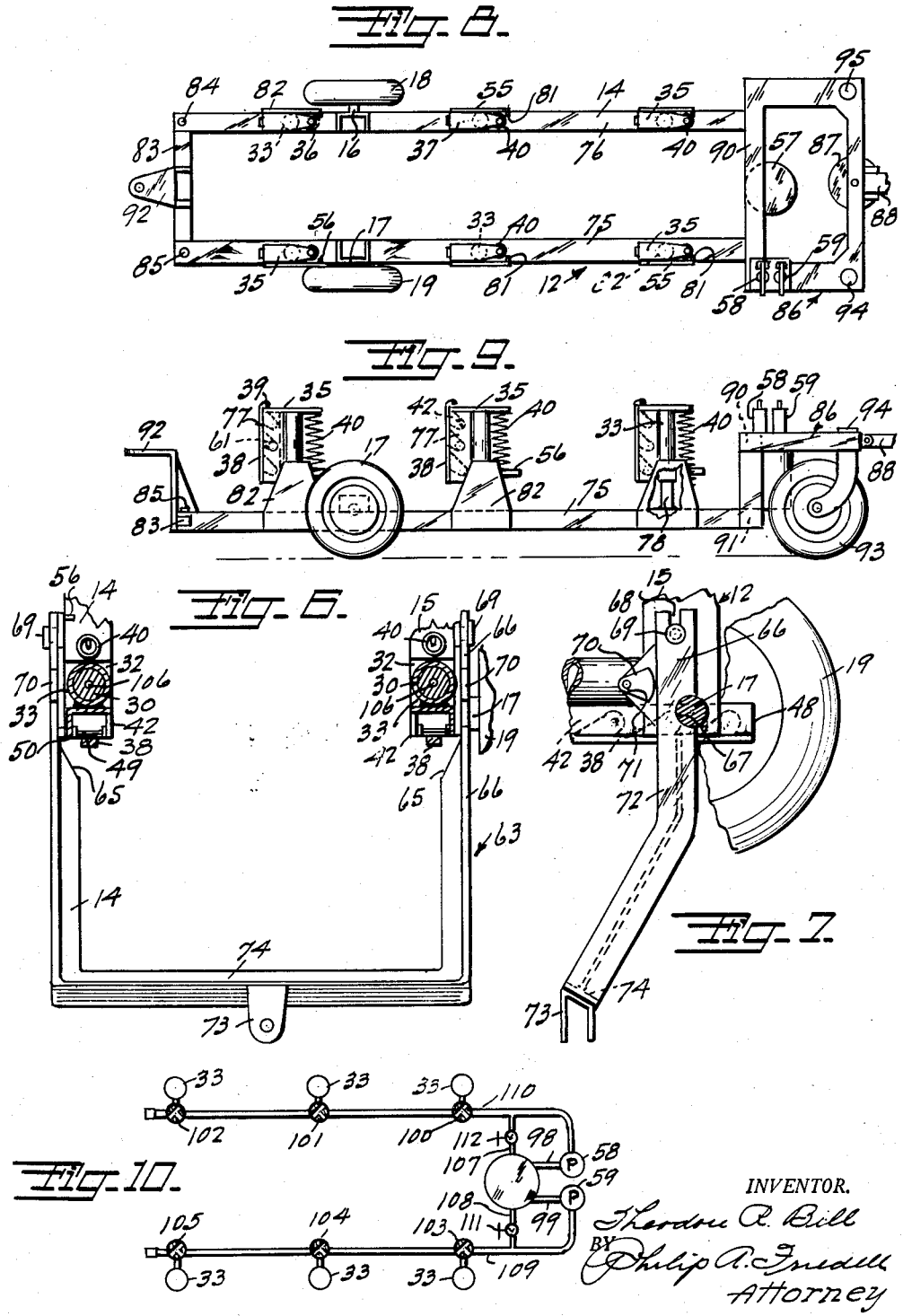
INVENTOR.
Theodore R. Bill
BY Philip A. Friedell
Attorney Patented Sept. 28, 1954

2,690,269

UNITED STATES PATENT OFFICE 2,690,269

CABLE REEL HANDLING AND TRANSPORTING MEANS

Theodore R. Bill, San Leandro, Calif.

Application January 14, 1952, Serial No. 266,325

12 Claims. (Cl. 214—390)

This invention relates to improvements in means for handling, warehousing, rotatably supporting, and for transporting cable reels for telephone cables and the like, and provides means which can be applied to trucks, trailers, or dollies, permitting the cable reels to be elevated, moved about or transported to some remote point while also forming a convenient rotatable support when the cable is being laid or strung.

Various types of cable reel handling apparatus are presently in use and which types usually require a great deal of manual effort and usually are not thoroughly stable and reliable, while my invention provides apparatus which requires a minimum of manual effort, is easily and conveniently operated, and can be made to handle one, or a plurality of cable reels of the same or of different sizes at one time, the elevating means being of the vertical lift hydraulically operated type with rotatable support means and shaft locking means for convenient paying out of the cable when required.

Furthermore, with my apparatus, if the transporting vehicle is supported on a sloping surface, the reel can be leveled for paying out, a feature which is not found in any existent types of apparatus, and the reel can easily be oriented with the line to be strung or laid. Provision is also made for coupling a plurality of these reel carriers in tandem for simultaneous transportation.

The objects and advantages of the invention are as follows:

First, to provide means for efficiently handling and transporting cable reels, and which means is equally adaptable to installation on dolly, trailer, or truck type vehicles.

Second, to provide means as outlined in which the cable reel is vertically elevated by hydraulic means and which hydraulic means includes rotatable support means for the cable reel shafts.

Third, to provide means as outlined in which the respective ends of the reel can be selectively elevated and lowered to any desired degree for leveling the axis of the reel when the cable is to be payed out for laying or stringing.

Fourth, to provide means as outlined which is adaptable for handling or transporting a plurality of reels with each reel individually adjustable for leveling, or for simultaneous and equal leveling or elevating and lowering of both ends for transportation or for unloading.

Fifth, to provide means as outlined which will handle or transport cable reels of different sizes without recourse to extraneous adjustments or additional or auxiliary apparatus.

Sixth, to provide means as outlined with means for positively locking the cable reel shaft in the rotatable support means associated with the hydraulic elevating and lowering means.

Seventh, to provide means as outlined which is relatively simple in construction, arrangement, and operation, and relatively simple to manufacture.

In describing the invention reference will be had to the accompanying drawings, in which:

Fig. 1 is a top plan view of the invention illustrated as a single reel carrying trailer or dolly.

Fig. 2 is a rear end elevation of Fig. 1.

Fig. 3 is an enlarged fragmentary view in side elevation of the elevating and lowering and shaft support and latching means.

Fig. 4 is a rear elevation of one of the hydraulic cylinders with the shaft support means removed, and showing one type of load transfer means for positive support of the load.

Fig. 5 is an enlarged section through the elevating and lowering means and illustrating another type of load transfer means.

Fig. 6 is a top plan view of a connecting yoke for a single reel carrier for coupling another carrier or a trailer thereto.

Fig. 7 is a side elevation of Fig. 6.

Fig. 8 is a top plan view of a multiple reel carrier.

Fig. 9 is a side elevation of Fig. 8.

Fig. 10 shows a simplified hydraulic circuit for a cable reel carrier.

The trailer type single reel carrier consists of a vehicle having a gap frame 12 of substantially U-shape open at the rear and having a span slightly greater than the maximum width of reel to be handled or transported, and includes a front cross member 13 and side members 14 and 15 rigidly formed together for maximum resistance to torsion in the side members in view of the twisting effort on the part of the stub axles 16 and 17 which are rigidly fixed to the side members and on which axles the wheels 18 and 19 are rotatable and which wheels are provided with fenders 20 and 21, the stub axles being positioned adjacent to the rear edges of the side members in the single reel carrier.

A goose neck as indicated in Fig. 8 for connection to a tractor or the like, or a tongue 22 for coupling to a rear end of a truck or the like, is connected to the front member 13, and a retractable caster 23 is provided for the forward end of the carrier unit and is illustrated as mounted on the tongue of the single reel carrier, and is shown swiveled at 24 and retractable through the bearing 25 to be selectively locked in vehicular or retracted position by a pin 26 passing through passages 27 provided in the spindle 28, though any other suitable retracting arrangement may be used. Handholds 29 are provided on the tongue for manual control of movement of the unit for loading, warehousing or storing.

Plungers 30 are rigidly fixed on drop members 32 which are fixed to the bottom of and extending from the rear ends of the side members, and a cylinder 33 is provided for each plunger and is slidable thereon, and the plungers are located to bring the rear edge of the cylinder wall about in line with the axis 34 of the axles.

A head 35 is fixed to the top of each of the cylinders and has a forward extension to provide anchoring means 36 for a spring, and also has a rearward extension 37 to provide a hinge connection for the latch 38 as indicated at 39. A tension spring 40 is provided for retraction of each cylinder and connects between the forward extension and the side member as indicated at 41.

Fixed to the wall of each cylinder is a stepped shaft support 42 having an inside leg which is provided with a series of vertically spaced shaft receiving recesses 43, 44, 45 and 46, and extending from the top of the cylinder to a point below the bottom 47 as indicated at 48, the drop member 32 terminating at the rearward edge of the plunger to clear this shoe. Securing means for the latch is indicated as consisting of a pin 49 passing through ears 50 and the lower portions of the respective legs 51 and 52 of the shaft support, though any other suitable means may be employed.

The load transfer means for dead load support of the cable reel in elevated position is indicated as consisting of a lug 53 fixed on the cylinder wall and operating in a vertical slot 54 in the vertical extension 55 of the frame, and a sliding latch member or draw bolt 56 operates in a horizontal slot formed in this extension for engaging the lug to transfer the load from the hydraulic jack through the draw bolt to the frame as shown in Fig. 5, and as shown in Fig. 4 the sliding latch member merely engages the bottom end of the cylinder wall indicated at 47.

The oil supply tank 57 for the hydraulic jacks is connected to the intakes of the two pumps 58 and 59, and which pumps may be operated simultaneously or selectively by means of the forked pump handle 60 which is supported on the frame in some suitable manner, each of the prongs of the handle having a socket to fit either of the pump levers to provide for attachment to one or both levers as desired. Power driven pumps may be substituted if desired.

When a cable reel is to be loaded onto this unit, the shaft 61 is inserted in the reel, the latches 38 are moved to a raised or clearing position, the vehicle is moved back to straddle the reel, and if none of the steps is in position to receive the shaft the pumps are operated to raise the shaft support to a position where the shaft will enter the first recess which comes into registry, the vehicle is moved back slightly further until the shaft enters the recesses. The latches are next swung down and locked in place.

The pumps are operated to elevate the reel, after which the load transfer member 56 is moved rearward to engage the lug or the bottom of the cylinder on the underside. The hydraulic fluid may now be released if desired for dead load support of the reel on the frame.

When a destination is reached, if the supporting surface for the vehicle slopes, the jacks can be selectively operated to bring the reel axis level, and the cable can be payed out as desired since its shaft is seated in bearings in which it can rotate. With the outer leg 51 left solid, the shaft cannot creep axially.

One method of forming a rear coupler for this single reel carrier is illustrated in Figs. 6 and 7 and consists of a U-shaped rigid member 63 which is indicated as being formed of a section of T-bar, the terminal end portion of the web of each leg of the member being removed as indicated at 65. A recess 66 is formed inwardly from the terminal end 66 of each head portion to engage about a headed pin 69 fixed in the side member, and another slot 67 is formed in the underside to engage over the axles 16 and 17. A dog 70 is pivotally supported by the bracket 55 as indicated at 71 and engages the top surface 72 of the head to lock the coupler against movement in any direction, the coupler having sufficient depth of gap to clear the rear edge of the reel. With this arrangement it is merely necessary to elevate the rear or cross member of the coupler and slide it into place over the axles and pins, and lower it into position. The dog will drop back to lock the coupler immovably. Coupling means 73 is provided on the cross member for hitching a trailer thereto.

Figs. 8 and 9 show a modification adapted to carry several reels of the same or different sizes and to all practical purposes is similar to the one just described with the exception that the side members 75 and 76 are virtually underslung, being located at a sufficiently low level to permit the jacks 77 to receive the shaft in the smallest diameter reel to be handled, since the shaft supports are operable only from the top surfaces of the side members, the plungers 78 being fixed to the tops of the side members and the load transfer means 56 being operable in brackets 82 fixed to the frame. Also, this frame extends rearwardly from the most rearward jack sufficient to clear the largest diameter reel to be carried and has a gate 83 hinged to one side member as indicated at 84 and is provided with latching means 85 for connection to the other side member. This gate provides a coupling between the side members to prevent spreading under load, and is also adaptable for hitching a trailer thereto.

The forward end of the frame is provided with a gooseneck 86 in view of the drop frame, and which gooseneck is provided with coupling means 87 for coupling to a tractor, and a removable tongue for coupling to a truck or the like.

The pumps 58 and 59 may be mounted in any convenient position, and the hydraulic supply tank is indicated as supported between the cross members 90 and 91. Casters 93 are indicated as pivoted in the front side members as indicated at 94 and 95 for full support of the forward end of the unit, though steered wheels or even a power drive unit with front wheel drive can easily be substituted.

A simple hydraulic circuit for a multiple reel carrier is shown diagrammatically in Fig. 10, though not limited to the arrangement shown, and in which two pumps 58 and 59 have their intakes in communication with the supply tank 57 through pipes 98 and 99, while the discharge sides of the pumps are connected to two series of three-way valves, one for each jack, as indicated at 100, 101, 102, 103, 104 and 105, which three-way valves in turn are connected to the bottoms of the plungers 78 and communicate with the cylinders through the passages 106 formed vertically through the plungers. By-passes 107 and 108, each with its own shut-off valve as indicated at 111 and 112, connect between the discharge lines 109 and 110 adjacent to the pumps, and the supply tank. This same circuit is equally applicable to the single carrier illustrated in Fig. 1 with the exception that the extensions of the circuit beyond valves 100 and 103 and the valves 101, 102, 104 and 105 are not required.

With this arrangement any pair of jacks can be simultaneously or selectively operated, either by simultaneous pumping or draining. For operation of one pair of jacks simultaneously, all three-way valves are closed to their jacks and with through passage in the discharge line except the jacks to be operated which are open to the cylinders, and the shut-off valves 111 and 112 are closed. Both pumps are operated alike by means of the forked handle 90 until the desired elevation is attained, following which the load transfer bars 81 are moved into supporting position. The shut-off valves may now be opened to drain the cylinders if desired. For independent operation the forked handle is applied to only one of the pumps.

Though a four-wheel trailer is illustrated, this unit can readily be built as a front wheel driven truck. Obviously with this multiple reel carrier it is necessary to place the reel shafts in the reels after they are in the approximate position for engagement in the shaft supports, the gate 83 being opened and the vehicle backed to straddle the reel and continued until the reel is in position for the most forward jack. The shaft is inserted in the reel, the carrier moved back slightly to engage the shaft in the support recesses, the latch is locked over the shaft, and the reel elevated and transferred to dead loading. The next reel can now be loaded in the second pair of jacks, each reel being elevated and transferred to dead loading before proceeding with loading of another reel.

I claim:

1. A carrier for a cable reel, in combination, a vehicle having a substantially U-shaped frame having a front cross member and side members providing a gap therebetween and having terminal ends, to span and receive a cable reel therebetween, a stub shaft projecting laterally from each terminal end and a wheel for each shaft, a shaft for the reel, and shaft supporting means including elevating and lowering means operable in a plane perpendicular to the plane of and supported by said side members and a rack for each elevating and lowering means and each having a plurality of vertically spaced shaft receiving recesses and mounted on said elevating and lowering means and overhanging said terminal ends for lowering to a level below the side members for elevating, lowering and support of reels of small diameters, and manual control means for said elevating and lowering means.

2. A structure as defined in claim 1; said shaft supporting means including each latch member hinged at its upper end to the rack and including releasable securing means for securing the lower end of the latch to the lower end of the rack for closing the recesses against release or removal of the reel shaft.

3. A structure as defined in claim 1; said elevating and lowering means comprising a plunger having its lower end fixed to the side member and including a plunger for each side member, a cylinder slidable on each plunger, a pump and a fluid connection for each cylinder, and a supply of fluid for said pumps, with said racks supported by said cylinders and overhanging the terminal ends of said side members with their lower ends extending to a plane below the undersides of the side members when the cylinders are in their lowermost positions, for cooperation with the shafts of reels of small diameter.

4. A structure as defined in claim 1; said shaft supporting means comprising a bearing member having a plurality of vertically spaced shaft receiving recesses each providing a bearing for the shaft, and a latch member for said bearing member for closing said recesses to lock a reel shaft therein and including securing means, for securing the shaft against removal from any one of said recesses, elevating and lowering means for each side member, each comprising two cooperative power members including a cylinder and a plunger with one of said power members fixed to the side member, said bearing members being supported by the other one of said power members, and projecting downwardly over said terminal ends to a plane below the underside of said side members when said cylinders and plungers are in retracted position for cooperation with reel shafts of reels of minimum diameters, and to maintain the space between the side members free of obstruction, a pump and fluid connection for each cylinder, and a supply of fluid and control means therefor for said pumps, with said pumps individually or simultaneously operable for leveling or uniform elevating at will.

5. A structure as defined in claim 1; a coupling member including a U-shaped frame including a cross member provided with a hitch for coupling a trailer thereto and with the legs of said U-shaped frame being connectable to the rearward ends of the respective side members and including cooperative connecting means, with said U-shaped frame having a gap sufficient to provide clearance for the largest diameter reel to be carried.

6. A cable reel carrier comprising, a vehicle having a U-shaped frame including side members and a front cross-member and having stub axles supported adjacent the terminal ends of said side members, and wheels for said axles, and with the side members spaced to form a gap open at the rear to receive a cable reel therebetween, a hydraulic jack for each side member each comprising two cooperative members and including a plunger and a cylinder, with one of said cooperative members fixedly mounted on a vertical axis on its side member, a bearing member fixed to the other one of said cooperative members and depending over the terminal end of and to a plane below the underside of the side member when the cooperative members are in retracted position, said bearing member having a plurality of vertically spaced shaft receiving and bearing recesses to selectively receive the shafts of cable reels of various diameters resting on the vehicle support surface, and having a cooperative latch for closing said recesses against removal or release of the reel shaft, a supply of fluid for said jacks, and pumping means and control means therefor for operating said jacks selectively or simultaneously for leveling or for uniform elevating, at will.

7. A structure as defined in claim 6, load transfer means comprising a sliding member cooperative with the other one of said cooperative members when the cooperative members are in their retracted position, and brackets mounted on the side members with said sliding members manually movable in said brackets to engaging position with the other one of said cooperative members for positively supporting the reel in an elevated position through said other one of said cooperative members for transport.

8. A structure as defined in claim 6; a hitch for the rear end of the vehicle for coupling a trailer thereto and comprising a U-shaped hitch frame including a cross member and legs with the terminal ends of the legs connectable to the terminal ends of the side members on the vehicle frame and providing a gap to clear a reel supported by the jacks, and means cooperative between said vehicle and said hitch frame for coupling said hitch to the vehicle frame at will.

9. A cable reel carrier comprising, a vehicle having wheels, a frame consisting of a front cross member and spaced side members with a clear gap formed between the side members for reception of a cable reel, a stub axle for the terminal end of each side member and having said wheels mounted thereon, a hydraulic jack mounted on each side member and operating in a vertical plane and each having a shaft supporting member having a vertically spaced series of shaft receiving recesses and supported by the elevating and lowering member of the jack and overhanging the terminal end of the side member and extending therebelow when the jack is in its retracted position for acceptance of minimum to maximum diameters of reels, and manual control means for controlling operation of said jacks.

10. A cable reel carrier comprising, a vehicle having a frame consisting of a front cross member and spaced side members with a clear gap formed between the side members for reception of a cable reel, a hydraulic jack mounted on each side member and having a plunger and a cylinder with the lower end of the plunger fixedly mounted on the side member and operating in a vertical plane, and a shaft supporting member supported by each cylinder and having a plurality of shaft receiving and bearing recesses vertically spaced for selective engagement of the shafts of reels of various diameters when the reels are resting on the vehicle support surface, and manual control means for controlling operation of said jacks; a sliding bar and a support therefor mounted on each side member in cooperative relation to the cylinder with the sliding bar manually movable when the cylinder is in elevated position for cooperation with the cylinder to engage the cylinder for transfer of the load from the hydraulic means to the frame.

11. A structure as defined in claim 10; said vehicle having stub axles with the jacks mounted immediately forward of the axis of the axles, and with said shaft supporting means overhanging said axis for substantial balance of the vehicle and transfer of the weight of the reel direct to the axles through the side members.

12. A structure as defined in claim 11; coupling means on said front cross member for coupling to a tractive device, and a caster for supporting the front end of the vehicle and retractable at will, and coupling means for the rear end of the vehicle in clearing relation to a cable reel mounted in said jacks and movable to clear said gap for reception of a cable reel, and having a hitch for a trailer.

References Cited in the file of this patent

UNITED STATES PATENTS

| Number | Name | Date |
|---|---|---|
| 1,261,428 | Norman | Apr. 2, 1918 |
| 1,587,842 | Knox | June 8, 1926 |
| 1,636,850 | Childress | July 26, 1927 |
| 1,789,343 | Rogers | Jan. 20, 1931 |
| 1,832,446 | Boe | Nov. 17, 1931 |
| 1,837,175 | Stuebing, Jr. | Dec. 15, 1931 |
| 2,359,961 | Anthony | Oct. 10, 1944 |
| 2,477,871 | Grogan et al. | Aug. 2, 1949 |
| 2,512,333 | Jaffa et al. | June 20, 1950 |
| 2,562,189 | Harris | July 31, 1951 |
| 2,603,369 | Soderstrom | July 15, 1952 |
| 2,650,724 | Bill | Sept. 1, 1953 |

FOREIGN PATENTS

| Number | Country | Date |
|---|---|---|
| 470,114 | Great Britain | Aug. 10, 1937 |